United States Patent [19]

Jayawant et al.

[11] 3,951,838

[45] Apr. 20, 1976

[54] SILICA SOL STABILIZERS FOR IMPROVING THE STABILITY OF SODIUM PERCARBONATE IN SOLID BLEACHES AND DETERGENTS

[75] Inventors: Madhusudan D. Jayawant, Hockessin; Paul C. Yates, Talleyville, both of Del.

[73] Assignee: E. I. Du Pont de Nemours and Company, Wilmington, Del.

[22] Filed: Oct. 10, 1973

[21] Appl. No.: 405,053

[52] U.S. Cl. .............................. 252/99; 252/186; 252/313 S
[51] Int. Cl.² ..................................... C11D 7/54
[58] Field of Search ................. 252/99, 186, 313 S

[56] References Cited
UNITED STATES PATENTS

| | | | |
|---|---|---|---|
| 3,122,417 | 2/1964 | Blaser et al. | 252/186 |
| 3,468,813 | 9/1969 | Mindick et al. | 252/313 S |
| 3,766,078 | 10/1973 | Kowalski | 252/186 |
| 3,847,830 | 11/1974 | Williams et al. | 252/186 |

FOREIGN PATENTS OR APPLICATIONS

| | | | |
|---|---|---|---|
| 870,092 | 3/1953 | Germany | 252/186 |

*Primary Examiner*—Thomas J. Herbert, Jr.
*Assistant Examiner*—Bruce H. Hess

[57] ABSTRACT

Sodium percarbonate of improved storage stability in solid bleach and detergent formulations is made by contacting the sodium percarbonate particles with an aqueous sol containing 3 to 8 percent W/V (gm./100 cc.) of silica which has a maximum particle size of 0.1 micron and which is prepared by deionizing a solution of a water soluble silicate to a pH of 3 to 10, in order to deposit on the percarbonate particles from 1 to 10 percent by weight of silica based on the weight of the percarbonate.

10 Claims, No Drawings

SILICA SOL STABILIZERS FOR IMPROVING THE STABILITY OF SODIUM PERCARBONATE IN SOLID BLEACHES AND DETERGENTS

BACKGROUND OF THE INVENTION

Bleaching agents generally used as laundry aids fall within two major categories: chlorine releasing and oxygen releasing compounds. Oxygen releasing bleaches are preferred since chlorine releasing bleaches are harsh to fabrics and fabric dyes and cause yellowing of many synthetic resin fibers. Oxygen releasing bleaches include hydrogen peroxide, compounds which release hydrogen peroxide in aqueous solutions and true per acids and their salts. Solid, oxygen-releasing bleaches are generally used both as bleach additives in laundry detergents and as the active ingredient in dry formulated laundry bleaches.

Detergent powders often contain hydrogen peroxide releasing compounds such as sodium perborate, sodium percarbonate, and the like in order to assist in the brightening and bleaching of textiles during washing. Sodium perborate is normally preferred as a solid bleach additive because it is more stable than percarbonate in detergent powders during prolonged storage. External moisture, the alkalinity of the detergent, the presence of different components in a detergent mixture and the free moisture content of the detergent contribute to the instability of sodium percarbonate in detergent compositions. Thus, percarbonates which are otherwise inexpensive, safe and effective bleaching agents, have not found widespread use in laundry detergents and other washing compositions.

Since the loss of hydrogen peroxide or the active oxygen content of sodium percarbonate occurs at a faster rate under humid conditions, several water resistant additives have been suggested as percarbonate stabilizers. Such additives which may impart moisture resistance to percarbonate are long chain fatty acids, their esters and amides, copolymer and wax emulsions and the like. To show maximum effectiveness, such hydrophobic additives should be added in relatively high concentrations to percarbonate. However, when such products are added to water, as in laundry wash, an undesirable insoluble residue remains behind.

Chemical stabilization of sodium percarbonate has been attempted by several workers in the field. Among the chemical stabilizers that improve sodium percarbonate stability most are magnesium compounds and sodium silicate. The preferred stabilizer for sodium percarbonate has been magnesium silicate which is incorporated in sodium percarbonate during its preparation from sodium carbonate and hydrogen peroxide.

German Pat. No. 870,092 discloses the use of an aerosol of fumed silica to stabilize percarbonate which may be used in bleaching or washing compositions. However, the fumed silica of that reference is aggregated in form, having particle sizes on the order of 2 to 10 microns. These particles have only a partially hydrated structure and are not dispersible in water to yield low viscosity, high concentration sols without the application of sufficiently high shear forces to disaggregate the particles, thereby causing the disaggregated surfaces to hydrolyze and eventually disperse. Not only are such procedures time consuming and cumbersome but they are costly as well, involving the application of excessively high quantities of energy to mechanically initiate the necessary chemical reaction (hydrolysis) to achieve dispersion. These considerations are discussed by K. A. Loftman in the publication "Ultrafine Particles," edited by W. E. Kuhn, published by John Wiley and Sons, Inc., (N.Y.) (1963), pp. 203–204, and by R. K. Iler, in the publication "Surface and Colloid Science," Vol. 6, edited by E. Matijevic, published by John Wiley and Sons, Inc., (1973), pp. 20 and 39–65.

SUMMARY OF THE INVENTION

It has now been found that the stability of sodium percarbonate in solid bleach and detergent compositions can be improved by contacting particulate sodium percarbonate with an aqueous sol containing 3 to 8 percent W/V (grams/100 cc.) of silica which has a maximum particle size of 0.1 micron and which is prepared by deionizing a solution of a water soluble silicate to a pH of from about 3 to about 10, in order to deposit on the percarbonate particles from 1 to 10 percent by weight of silica based on the weight of the percarbonate.

It is only necessary to introduce an aqueous silica sol to particles of sodium percarbonate to prepare the stabilized sodium percarbonate of this invention. Although the mechanism involved in the unique stabilizing effect of this invention is not understood, it is hypothesized that the pH of the sodium percarbonate is sufficiently alkaline to cause substantially immediate gelling of the silica on the surface of the percarbonate particles and thus render the percarbonate moisture resistant. As a consequence, the treated percarbonate exhibits greatly increased stability in detergent compositions over the same percarbonate which has not been treated with the silica sol of this invention. Such an improvement is extremely significant because sodium percarbonate, which is quite stable in the dry state, loses its active oxygen at an accelerated rate when mixed with ingredients commonly used in detergent or solid bleach compositions.

DETAILED DESCRIPTION OF THE INVENTION

In the practice of this invention, particles of sodium percarbonate, that is, powders, granules, aggregates and the like particulate forms, are contacted with a fluid, non-gelled sol which contains from about 3 to 8 percent W/V (grams/100 cc.) of silica in water. If desired, lower concentrations may be employed, in which case the desired amount of silica is obtained on the surface of the percarbonate particles by recycling the sodium percarbonate or repeated applications of the silica sol.

Generally, noticeable results can be observed when as little as about 1 percent by weight of silica based on the weight of the percarbonate is introduced onto the particulate percarbonate surfaces. While there is no actual upper limit on the amount of silica to be deposited on the percarbonate particles, at concentrations greater than about 10 percent by weight of silica, the percarbonate particles will become encased with a silica envelope and their solution rate will be seriously reduced. In addition, undesirable insoluble silica residues will remain behind on fabrics or other substrates at the end of the washing and/or bleaching cycles. Thus, it has been found that a range of from about 1 percent to about 10 percent by weight of silica based on the weight of the percarbonate may be used generally, and a range of from about 1.2 to about 5 percent by weight is preferred.

The aqueous silica sol should have a pH of from about 3, which is the minimum pH attainable by deionization of the silicate, to 10, preferably 6.5 to 10 and most preferably 8 to 9.5. Above a pH of about 10, the SiO₂ in the sol dissolves to form the disilicate initially and, with increasing pH, metasilicate ions. In practice, at a pH of from about 3 to 5, the sols formed are metastable and must be used within about 24 hours. The pH range of from about 5 to 6.5 yields the least stable sols of this invention and they must be used within about one hour. For that reason, these sols are eminently suitable for use on a continuous line where they can be used continuously as they are continuously or semicontinuously produced.

The silica sol used in the practice of this invention is prepared by decationizing aqueous solutions of any water soluble silicate such as the alkali metal (sodium, potassium or lithium) silicates, guanidine silicate, tetramethyl ammonium silicate and the like or mixtures of any water soluble silicates, with a cation exchange resin to the exact pH desired.

Any suitable hydrogen form cation exchange resin may be used in preparing the silica sol of this invention. Preferably, the ion exchange resin is of the strong acid or weak acid type including, for example, Rexyn 101 (H) supplied by Fisher Scientific (strong acid type); Dowex 50W X8 available from Ionics, Inc. (strong acid type); Rohm & Haas IRC 84 and IRC 50 resins of the carboxylic acid type (weak acid); Rohm & Haas H-120 resin of sulfonic acid type (strong acid) and any of those listed in U.S. Pat. No. 3,468,813 issued to Mindick et al. on Sept. 23, 1969 and the like. The method described in the Mindick et al. U.S. Pat. No. 3,468,813 may also be employed to make the water soluble silicate sols which may be deionized in a continuous or batchwise manner in the practice of this invention. Preferably freshly prepared silica sol should be used in order to avoid increase in particle size and degree of aggregation and gelation. The silica sol should be used within about 24 hours after it is made when it has a pH in the range of 3 to 5 and within an hour after it is made when it has a pH in the range of 5 to 6.5.

To derive maximum benefits from a given cation exchange resin it would be desirable to use sodium silicate of low alkalinity or high SiO₂ content. For example, a silicate of 3.7:1 to about 2.5:1 SiO₂:Na₂O ratio would be most suitable for this invention. Less resin is used when a higher ratio silicate is employed. Further a given amount of resin can be used for a longer period of time when a higher ratio silicate is employed because of the lower amount of sodium hydroxide in the silicate solution. While there would be little difference between the decationization product of sodium metasilicate or a silicate of 3.7:1 SiO₂:Na₂O ratio as far as this invention is concerned, the economics of the process will favor the use of high ratio silicates.

The deionized silica of this invention which has a pH in the range of 3–10 forms sols of colloidal silica (silicic acid and polysilicic acid) particles in marked contrast to the so-called soluble silicates which form true solutions and have a pH greater than 10 and up to 13 for solutions having a minimum concentration of at least 1 percent. The only soluble form of silica, silicic acid (Si(OH)₄) in the sols of this invention amounts to no more than about 100 ppm. However, this monomeric silicic acid constantly increases in size by polymerization to polysilicic acids which have the chemical structure

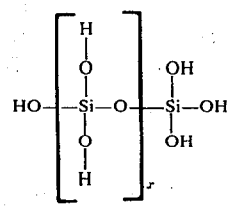

which cross links across the repeating SiO₃ units. It is believed that when such particles are deposited from aqueous sols onto percarbonate particles, they link together and coagulate into relatively close-packed clumps.

Silica having a particle size greater than 0.1 micron are not suitable in the practice of this invention since such sols containing such large particles gel and, hence, are not the low viscosity colloidal materials required in order to practice this invention. While silica particles ranging in size from 0.001 to 0.1 micron are eminently suitable in the practice of this invention, particles ranging from 0.002 to 0.05 micron are most preferred.

In pure crystalline form, sodium percarbonate has the general formula 2Na₂CO₃·3H₂O₂. Generally, sodium percarbonates contain approximately 67.5 to 97 percent by weight of sodium carbonate and about 32.5 to about 3 percent by weight of hydrogen peroxide. Thus, sodium percarbonate is an adduct of sodium carbonate and hydrogen peroxide in a wide range of proportions including any of those commercially available. Percarbonates and methods for their preparation including those described in U.S. Pat. Nos. 2,380,620 issued to O. H. Walters on July 31, 1945; 2,448,058 issued to V. W. Slater and W. S. Wood on Aug. 31, 1948; 2,541,733 issued to J. H. Young on Feb. 13, 1951; 3,555,696 issued to H. Pistor et al. on Jan. 19, 1971; Austrian Pat. No. 140,553 issued to Osterreichische Chemische Werke Gesellschaft M.B.H. in Wien on Feb. 11, 1935 and so on are also suitable.

The silica sols of this invention may be introduced to percarbonate particles which have been stabilized previously with any substance which acts as a stabilizer for percarbonate such as, for example, magnesium compounds such as those listed elsewhere, herein; complexing agents such as ethylene diamine tetraacetic acid, diethylene triamine pentaacetic acid, benzoic acid and so on to yield particularly stable products. Any stabilizing amount of such additives may be employed but usually from about 500 to about 10,000 ppm are used.

The silica sol is introduced to the percarbonate in any suitable manner. It is often advantageous to introduce the silica sol to the percarbonate in a reactor after the percarbonate is formed but before it goes to the dryer although it can also be introduced after drying followed by a further drying step. The silica sol may be added, applied, sprayed onto or in any other way introduced to the percarbonate particles using any suitable dry mixing equipment such as, for example, a rotary mixer, a fluidized bed, mechanical mixers or blenders. Further, the particles may be recycled as many times as desired and no critical time or temperature limits need be observed.

Preferably, the silica sol is sprayed onto a moving bed of percarbonate particles using any standard device for spraying a liquid onto a solid. In one particularly efficient operation, the percarbonate is placed inside a rotating drum mixer having the shape of an elongated cylinder, the interior walls of which are scraped by a rotating screw which simultaneously mixes the contents and moves them slowly along the length of the cylinder. The silica sol may be sprayed onto the percarbonate particles by jets located at the entrance or near the entrance of the cylinder. The particles thus contacted are then conveyed through the cylinder which preferably also contains a heating zone to aid in drying the product; drying temperatures of from about 25°C. to about 100°C. are most efficacious.

In one preferred embodiment of this invention, the aqueous silica sol contains magnesium ions which may be introduced to the sol as a concentrated solution of a magnesium salt or in any other suitable manner. Any magnesium salt which is water soluble may be used as the source of the magnesium ions including, for example, magnesium sulfate, magnesium chloride, magnesium bromide, magnesium acetate, magnesium fluosilicate, and the like and mixtures thereof. The magnesium ions coexist in the silica sol without reacting with the silica to form an insoluble compound such as, for example, $MgSiO_3$. However, once introduced to the sodium percarbonate, the magnesium ions react into the silica structure and function to inactivate any stray decomposition catalysts which may be contained in the peroxide or sodium carbonate. To achieve this goal efficiently it is preferred that the silica sol contains about 20 ppm of magnesium ions although from 1 to 100 ppm may be employed.

The stabilized percarbonates of this invention may be used in any detergent or dry bleach formulations. As examples, the detergent systems described in U.S. Pat. Nos. 3,458,665 issued to Schiefer et al. on Aug. 5, 1969; 3,415,752 issued to Browning et al. on Dec. 10, 1968; Canadian Pat. No. 834,690 issued to Walter P. Fethke on Feb. 17, 1970 as well as any of those described in Synthetic Detergents by A. Davidsohn & B. M. Milwidsky, C.R.C. Press: Cleveland, 1968, particularly on pages 66 to 207 and the like may be used. Generally, from about 3 percent to about 25 percent by weight of sodium percarbonate based on the total weight of the detergent is employed.

The stabilized sodium percarbonates of this invention may also be used in dry bleach formulations such as, for example, those described in U.S. Pat. Nos. 3,398,096 issued to Balaram Das et al. on Aug. 20, 1968; 3,697,217 issued to Lodric Maddox on Oct. 10, 1972; 3,522,184 issued to Y. Nakagawa et al. on July 28, 1970 and the like. Generally, from about 10 percent to about 70 percent by weight of sodium percarbonate based on the total weight of the bleach formulation is employed.

While the invention has been described in considerable detail with reference to sodium percarbonates, it is to be understood that the process of this invention and the advantages to be derived thereby will be equally applicable to particles of any perhydrate such as alkali metal perphosphates, perborates, persilicates and urea peroxides and the like.

The invention is further illustrated but is not intended to be limited by the following examples in which all parts and percentages are by weight unless otherwise indicated.

EXAMPLE 1

A. Preparation of Silica Sol

A solution of 25 parts of $Na_2SiO_3.5H_2O$ in 200 ml. of distilled water was decationized to a pH of 6.4 by slowly adding a previously washed sulfonic acid type resin (Rexyn 101H, an organic strong acid cation exchanger, sulfonated polystyrene copolymer, hydrogen form, medium porosity, sold by Fisher Scientific Co.) to the well stirred silicate solution. A 3.54 percent $SiO_2$ silica sol was obtained which contained silica particles having an average size of about 0.005 micron. The silica sol was then decanted into a spray bottle and used in the form of a uniform fine mist propelled by Freon gas. This procedure was used to prepare the sols used during the course of the following preparation.

B. Application of Silica Sol to Sodium Percarbonate

Onto 100 parts of sodium percarbonate containing about 500 ppm Mg and about 4100 ppm $SiO_2$ as stabilizers and having 12.8 percent active oxygen in a one liter stainless steel rotary reactor, was sprayed 20 ml. of the silica sol described in A. The rotary reactor was rotated at about 35 rpm and was inclined at about a 30° angle to the horizontal. The moist percarbonate was then dried at 50°C. for a half hour in a forced air oven. The product was then transferred to the rotary reactor and was sprayed with about 30 ml. of freshly prepared silica sol of 2.83 percent W/V (grams/100 cc.) concentration (made by decationizing 5 parts of $Na_2SiO_3.5H_2O$ in 50 ml. water with Rexyn 101H resin to a pH of 6.4) and dried at 50°C. for a half hour. This operation was repeated three more times, each time spraying the oven dried sodium percarbonate with 30 ml. of 2.83 percent silica sol spray. At the end of the fifth application the product was dried at 50°C. The final product weighed 98.5 grams and contained 12.3 percent active oxygen. The amount of silica in the final product due to silica sol application was found to be 2.16 percent.

In four months of shelf storage the product lost no active oxygen.

C. Detergent Stability

An experimental detergent formulation was prepared by slurrying the ingredients of Table I in 150 ml. water and drying the slurry in polyethylene trays in a forced air oven overnight at 70°C.

TABLE I

| Ingredients | |
|---|---|
| Linear tridecyl benzene sodium sulfonate | 32 |
| Shell's nonionic surfactant Neodol 45-11, a $C_{12}$ to $C_{15}$ linear primary alcohol ethoxylate | 4 |
| Sodium tripolyphosphate ($Na_5P_3O_{10}$) | 64 |
| Sodium silicate ($SiO_2:Na_2O = 2.35:1$) | 14 |
| Optical brightener | 2 |
| Sodium sulfate | 80 |
| $MgSO_4 . 7H_2O$ | 4 |
| Total | 200 |

The next day the dry detergent was crushed, passed through a 40 U.S. Standard sieve screen and the moisture content determined to be 18.7 percent. After drying further to lower the moisture content to $11.1 \pm 0.5$ percent, the detergent was stored in a closed jar for 60 hours at room temperature. Thereafter, a mixture of 18.0 gm. of the detergent and 2.0 gm. (10 percent of the total detergent) of the sodium percarbonate of this example was prepared (Sample A) and the same mixture except that unstabilized percarbonate was used (Sample B) was also prepared. The test samples were kept for 6 days at 90°F. and 85 percent R.H. and the detergent stability was measured.

|  | Percent A.O. Loss | Percent Improvement |
|---|---|---|
| Sample A | 14.6 | 27.7 |
| Sample B | 20.2 | — |

EXAMPLE 2

A. Preparation of Silica Sol 1000 ml. of a solution of 3.25:1 $SiO_2:Na_2O$ sodium silicate containing 6 gm. of $SiO_2$/100 ml. solution were deionized to pH 10. by adding and stirring Rohm & Haas IRC 50 carboxylic acid resin. The addition was done in a beaker and the temperature of the silicate solution was kept about 35°C. The addition was done over 20–25 minutes.

The resin was filtered off at pH 10. About 900 ml. of this deionized silicate was deionized further to pH 9.1 with Dowex 50W ion exchange resin. This was then filtered off and the pH 9.1 sol was used in percarbonate stabilization. The sol contained 4.85 grams of $SiO_2$/100 ml. of sol and the silica particles had an average size of 0.002 micron.

B. Application of Silica Sol on Sodium Percarbonate

A total of 62.9 parts of silica sol at the pH and concentrations given in A, above was sprayed onto 100 parts of a sodium percarbonate which has an active oxygen content of 13.1 percent and which contains about 685 ppm Mg and 4300 ppm of $SiO_2$ as stabilizers. The spraying was done with the use of a spray mist trigger-operated sprayer, which generates atomizing pressure with the squeeze of a trigger. The fine mist of silica sol was sprayed onto the percarbonate in a rotary reactor as described in Example 1. Since the amount of water in the silica sol was quite high, the percarbonate was alternately heated to about 40°C. and cooled (to minimize decomposition) with the aid of an electric air gun which prevented the wetting and balling of the percarbonate. The product was then dried at 50°C.

In the control experiment only 33.2 parts of distilled water devoid of silica were sprayed onto 100 parts of sodium percarbonate. This amount of water was just sufficient to keep the percarbonate moist and free-flowing but not excessively wet and balled. The product was then dried at 50°C.

Percarbonate-detergent mixture stability tests were then run by blending 3.75 gm. of each percarbonate of Table II with 71.25 gm. of previously blended commercial Tide detergent made by Procter and Gamble Company from a single source and storing the mixtures in non-barrier paperboard cartons for 6 days at 90°F. and 85 percent relative humidity. The improvement in detergent stability of percarbonate due to the treatment with the silica sol of A having a pH of 9.1 over the control percarbonate was 35.8 percent.

TABLE II

| Amount of $SiO_2$ on Sodium Percarbonate | Active Oxygen of the Percarbonate | Active Oxygen Loss in 6 Days in Tide Detergent at 90°F./85% R.H. |
|---|---|---|
| 2.14% | 12.3 | 13.8 |
| — (Water treated) | 12.8 | 21.5 |

EXAMPLE 3

A. Preparation of Silica Sol

Approximately 20 lbs. of Dowex 50 WX8 strong acid cation exchange resin were repeatedly washed with deionized distilled water to remove all free sulfuric acid. This was done in a 35 gal. polyethylene drum. When the pH of the water wash reached a maximum (about 3.5), as much water as possible was decanted off from the drum. To the moist resin was added a solution of 3.25:1 $SiO_2:Na_2O$ ratio sodium silicate containing about 7 gm. $SiO_2$/100 cc. solution. (The excess was used to compensate for the water in the resin.) Vigorous stirring was applied during water addition. Water addition was continued until the 35 gal. drum was filled to capacity. The pH of the supernatant was 3.2. The silica sol was then carefully decanted into another 35 gal. polyethylene drum via a 40 U.S. Standard mesh screen. This sol was then used for percarbonate stabilization.

The silica (or polysilicic acid) content of the silica sol was determined by evaporating all free water from a small sample and then drying the residue under an infrared lamp to constant weight. The silica content of the silica sol batches made this way was 6.1–6.3 percent (W/V).

For additional silica sol the above procedure was repeated, except that freshly washed acid resin was used every time. The pH of the silica sol was generally 3–3.5. Silica sols made in this manner were kept at about 20°C. and used in less than about 20 hours.

B. Stabilization of Sodium Percarbonate

Sodium percarbonate was made in a continuous manner in a cylindrical rotary reactor. The product was made by feeding 1.5 parts of anhydrous soda ash at one end and sprinkling about 1 part of 70 percent hydrogen peroxide through four atomizing nozzles placed within the entrance zone of the reactor. Magnesium sulfate was previously added to $H_2O_2$ to give about 600 ppm Mg in the final product. Sodium silicate ($SiO_2:Na_2O$ = 2.5:1 ratio) was sprinkled on soda ash at the entrance to the reactor. The resulting moist sodium percarbonate was sprayed with the 6 percent silica sols of pH 3–3.5 having an average particle size of about 0.01 micron within the exit zone of the reactor. The amount of silica deposited on the percarbonate was calculated as 1–1.5 percent $SiO_2$ based on the weight of the final product.

The silica sol treated percarbonate was then dried in a fluidized bed dryer by hot air at about 50°–70°C. The active oxygen content of the product emerging from the dryer was about 13–13.7 percent. Several hundred pounds of such silica sol treated sodium percarbonate were made in this manner.

In a control experiment, everything else was the same except that instead of silica sol, an equivalent amount of water was added to the percarbonate from the atomizing nozzle in the exit zone of the reactor. Several hundred pounds of control material were made in this way.

The six day stability of mixtures of commercial Tide detergent made by Procter & Gamble Company and a few random samples of percarbonate was determined according to the procedure of Example 2. The average active oxygen loss from mixtures of Tide and three control sodium percarbonate samples was 14 percent, while the average active oxygen loss of mixtues of Tide and five 1 to 1.5 percent silica treated percarbonate samples was 9.8 percent. This represented an improvement of 30 percent in the detergent stability sodium percarbonate stability.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A method for preparing a sodium percarbonate having improved stability in solid bleach and detergent formulations which comprises treating particles of the percarbonate with an aqueous sol containing from about 3 percent to about 8 percent of silica which has a maximum particle size of 0.1 micron which is prepared by deionizing a solution of a water soluble silicate to a pH of from 3 to 10, and depositing 1 to 10 percent by weight of silica based on the weight of the percarbonate on the percarbonate particles, and drying the resulting product.

2. The method of claim 1 wherein from about 1.2 to 5 percent by weight of silica is deposited on the percarbonate.

3. The method of claim 1 wherein the water soluble silicate is an alkali metal silicate.

4. The method of claim 3 wherein the alkali metal silicate is sodium silicate.

5. The method of claim 1 wherein the pH of the silica sol is 6.5 to 10.

6. The method of claim 1 wherein the pH of the silica sol is 8 to 9.5.

7. The method of claim 1 wherein the sol is sprayed onto the sodium percarbonate.

8. The method of claim 1 wherein the percarbonate is stabilized with magnesium ions or a complexing agent before it is treated with the aqueous sol.

9. A percarbonate having improved stability in a solid bleach or detergent formulation which comprises the product of the method of claim 1.

10. A solid bleach or detergent formulation containing a percarbonate stabilized against degradation in the bleach or detergent formulation by the method of claim 1.

* * * * *